United States Patent Office 3,343,209
Patented Sept. 26, 1967

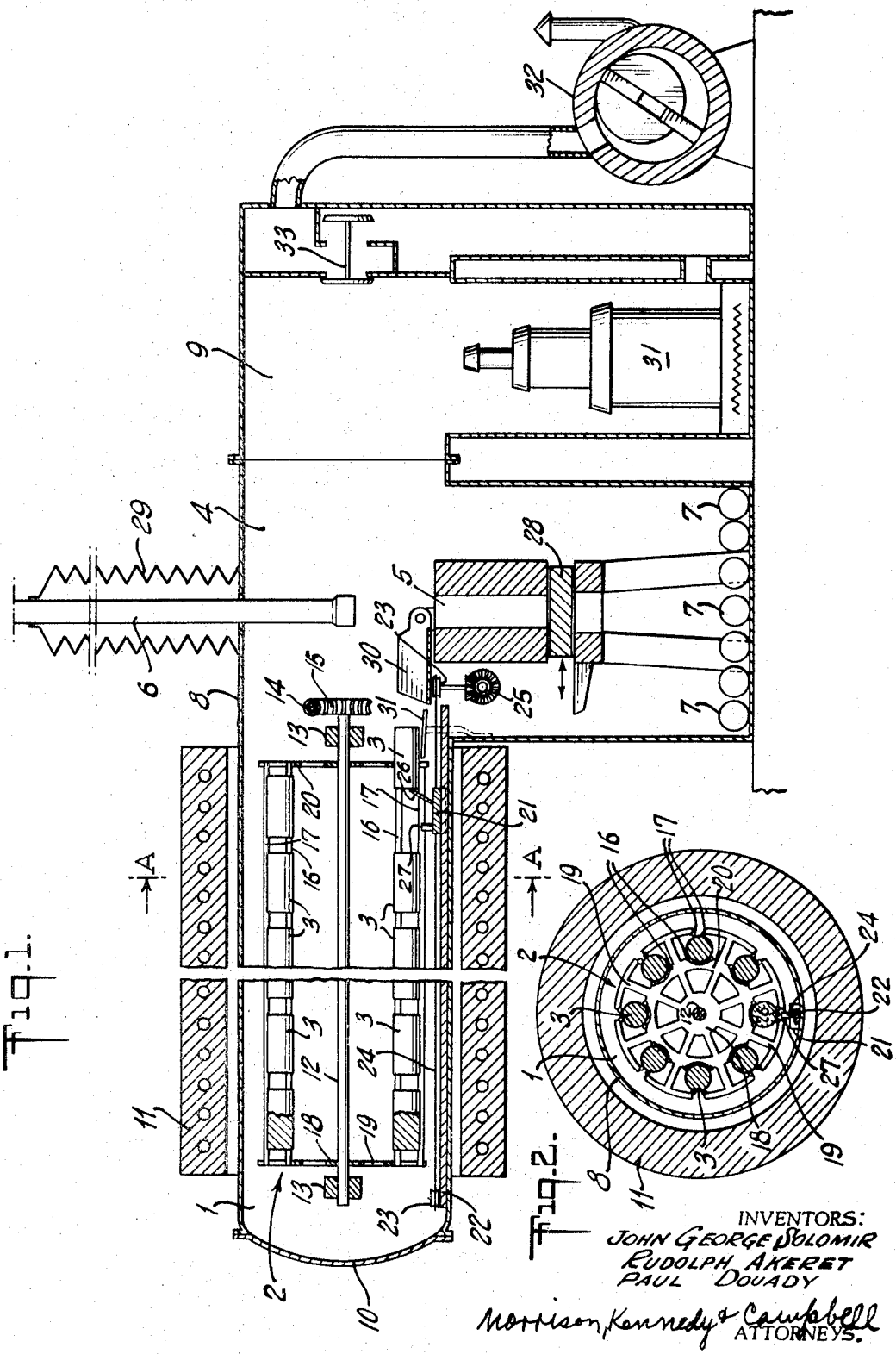

3,343,209
APPARATUS FOR THE MANUFACTURE OF DENSE SINTERED ARTICLES
John G. Solomir, Marthalen, and Rudolf Akeret and Paul Douady, Neuhausen am Rheinfall, Switzerland, assignors to Swiss Aluminum Ltd., Chippis, Switzerland, a joint-stock company of Switzerland
Filed Feb. 15, 1966, Ser. No. 527,434
Claims priority, application Switzerland, Mar. 27, 1963, 3,894/63
13 Claims. (Cl. 18—4)

ABSTRACT OF THE DISCLOSURE

Apparatus for the manufacture of dense sintered compacts from powdered material, embodying a cage-like drum having inner and outer rows of spaced slats extending parallel to the axis of the drum and arranged to hold cold compacts between them.

Summary of invention

An object of the invention is the provision of apparatus for the manufacture of dense sintered compacts and of cold-compact-receiving devices therefor which facilitate the degassing and dehydration of a plurality of cold compacts in heat and in a vacuum which can be as high as $10^{-6}$ mm. Hg, and the subsequent transferring and warm pressing the said compacts while still warm in the same high vacuum.

This application is a continuation-in-part of our copending application Ser. No. 355,029, filed Mar. 26, 1964, now Patent No. 3,278,301.

The present invention, relating first of all to the manufacture of sintered aluminum compacts, may also be applied to other metallic as well as nonmetallic, e.g. ceramic, material.

The manufacturing in a vacuum dense sintered bodies with a low content of gas according to this invention is characterized by the facts that cold-compacts are made from powder, that a number of these compacts, without being wrapped, are heated and sintered in a vacuum inside the heated portion of a gastight chamber, that the compacts are then, one after the other, while still under vacuum, transported to another portion of the chamber and, one at a time, submitted to a hot-upsetting operation inside the container of a compacting press.

For the manufacture of sintered aluminum compacts in vacuo from an oxide containing aluminum powder, there are made from this powder cold-compacts a number of which, without being wrapped, are heated for some hours to a temperature somewhat below the melting point of aluminum and sintered inside the heated section of a gastight chamber, the compacts thus degasified being then, still in vacuo moved, one at a time, into another section of the chamber and are there submitted to a hot-upsetting operation inside the container of a compacting press.

When working by this method it is advisable to keep the cold-compacts after 1 to 10 hours, preferably 2 to 5 hours heating at a temperature of 550 to 650° C., preferably 600 to 630° C. for 2 to 100 hours, preferably 12 to 25 hours. Towards the end of this heat-treatment in the heated portion of the vacuum chamber there is to be kept a vacuum of less than 10 mm. Hg, preferably of less than $10^{-2}$ mm. Hg for at least the last one hour.

The vacuum may be applied from the beginning of the heat-treatment; it is however advisable to start with an average vacuum and to apply the high vacuum only after the sintering temperature (above 550° C.) has been attained.

The apparatus for the manufacture of dense sintered compacts in a vacuum, according to this invention consists substantially of a gastight chamber connected to a vacuum-pump unit, a portion of which chamber, being developed into a sintering chamber, is provided with a heating device as well as a device to receive a number of cold-compacts, in which sintering chamber these compacts are submitted to heating and vacuum-sintering; and a further portion of which gastight chamber is developed into a pressing room, wherein at least the tooling of a compacting press is accommodated and where the sintered compacts are subsequently hot-upset, one at a time, the vacuum chamber being equipped with a transport device for the moving of the individual compacts from the heated portion of the chamber to the container of the press.

The device inside the sintering furnace receiving the compacts to be sintered may have the form of a drumshaped receptacle. In order to keep the surface of the compacts as free as possible for degasification, the supporting members of the receiving device are preferably formed of slats, e.g. grids.

The accompanying drawing presents schematically and as an example one version of the apparatus according to this invention.

FIG. 1 presenting a longitudinal section and
FIG. 2 presenting a cross section following the line A—A of FIG. 1.

The apparatus chiefly comprises a heatable sintering chamber 1 containing a device 2 for simultaneously receiving a number of cold-compacts 3 to be degasified and sintered, a pressing room 4 wherein the compacting tools, i.e. the container 5 and the plunger of the press 6, are situated respectively, are reaching in to leave sufficient room for the reception of the hot-upset compacts 7 of one charge, whereby these members are enclosed in a vacuumtight metal casing 8 connected to a vacuum-pump unit 9. The heatable sintering chamber 1 has cylindrical shape and is closed at one end by a cover 10 which may be removed, e.g. for the charging of the cold-compacts 3 into the receiving device 2. The sintering chamber 1 is heated from outside by an electrical furnace 11 open at both ends, which advantageously can be displaced longitudinally and may be removed for controls or repair purposes. It is however possible as well to provide for a complementary heating inside the sintering chamber or even to accommodate the complete heating device inside this sintering chamber.

The receiving device 2 consists of a drumshaped cage rotatable round its axle 12. Both ends of this axis are embedded in the bearings 13 fixed to the casing of the sintering chamber 1 by supporting members not shown in this drawing.

The rotation of the receiving device 2 is performed through a worm gear drive 14–15 the spindle 14 of which is reaching out through the casing of the vacuum chamber and is operated from the outside. Instead of a worm gear drive a bevel gear or any other form may be adopted.

In order to keep the surfaces of the individual cold-compacts 3 placed inside the receiving device 2 as free as possible for the degasification, the actual supporting members are made of slats arranged in the longitudinal direction of the cage in a way to form two concentric circles, whereby the slats of the inner circle are designated by the number 16 and those of the outer circle by the number 17. These slats 16 and 17 may be fixed at both of their ends to discs fixed for their part to the axle 12 and forming the front ends of the cage 2. For the feeding and removing of the cold-compacts respectively into and out of the cage the discs have perforations in the extension of the rows of cold-compacts. For reasons of vacuum technique however, the front end discs of the cage preferably do not have massive center portions but are developed into wheels with spokes 18 in order to facilitate the degasification through these front ends. For reasons of stability it is advisable to connect the spokes 19 by a ring 20, arranged between the rows of cold-compacts 3 and the axle 12 of the cage 2, to which ring the inner slats 16 of the cage are fixed. When the cage has a certain length it may be necessary to support the slats 16 and 17 by further wheels with spokes arranged between the ends of the cage.

Inside this receiving device the cold-compacts are set within the single rows at short distances in order not to obstruct the degasification in any direction.

In FIG. 1 only the top and the bottom row of cold-compacts with their corresponding supporting slats are shown, in order not to overcharge the drawing. There are however arranged in the cage such rows of cold-compacts and such supporting slats round about, as is to be seen in the cross section FIG. 2.

In the apparatus as described the removing of the sintered compacts from the cage is done by means of a sliding carriage 21. This carriage travels on a rail 22 fixed in longitudinal direction to the inside, preferably the bottom, of the sintering chamber 1 and reaching out into the adjacent pressing room, which sliding carriage is displaced by an endless wire rope 24, arranged between two return pulleys 23 and being moved to and fro from outside the vacuum chamber by a suitable gear 25.

The sliding carriage has a hinged tappet 26 held in upright position, e.g. by a spring not shown in this drawing. This tappet 26 is able to stretch in between two of the outer slats 17 supporting the compacts of one file.

Besides this the sliding carriage 21 has a fixed security pin 27 which too stretches in between the outer slats 17 of the cage and protects the hinged tappet 26 from being damaged through unintended turning of the cage 2 during the removing of the compacts 3.

In order to give way to the sliding carriage to pass with upright tappet by the wheels with spokes, the outer rings of the latter are broken between the spokes, as shown in FIG. 2. Therefore the end portions of these spokes have the shape of an anchor to the flukes of which the outer slats 17 of the cage are fixed.

During the degassing treatment the sliding carriage has its place outside the range of the cage in the unheated pressing room of the vacuum chamber.

To remove the first compact the drum cage is first brought into a position which places one row of compacts exactly above the sliding carriage and in which position the discharging can proceed. Then the sliding carriage is moved into the sintering chamber so far that the hinged tappet 26, being pressed down when passing by the first compact, gets back in its upright position behind this first compact and into the interstice between the latter and the second compact. Then the sliding carriage is pulled out of the sintering chamber whereby the first compact is removed out of the cage.

To remove the second compact out of the cage, the sliding carriage is drawn back into the sintering chamber so far that the hinged tappet is set up again into the interstice between the second and the third compact and then pulled out again from the sintering chamber. This proceeding is repeated until all the compacts of one file are removed from the cage.

Subsequently the sliding carriage is removed out of the range of the cage, and the cage turned so far as to place a further file of compacts into removing position. The compacts of this file are then removed in the way already described.

Obviously it is possible too to remove several compacts together at the same time from the cage and to submit them to the hot-upsetting in the container of the press one at a time. At any rate the capacity of the receiving device of the sintering chamber is, in the case of the invention as described, a multiple of the capacity of the container of the press, which means that the number of compacts being heated at one time requires a plurality of hot-upsetting operations. But even when it is said in the present description of this invention that the compacts are hot-upset one at a time, this invention nevertheless comprises the possibility to manufacture compacts of a small size, allowing to feed several of these compacts simultaneously to the container of the press and to submit them to the hot-upsetting operation at once.

Inside the pressing room 4 there is placed the heated container 5 of a compacting press, propped and fixed in any suitable manner to the bottom of the vacuum chamber. The bottom of this container is formed by a blind die 28 laterally movable from the outside. It is however possible too to provide for another hydraulic punch entering through the bottom of the pressing chamber, instead of a blind die. Through the casing of the vacuum chamber passes in from the outside the punch 6 of the press, a pair of bellows securing the vacuum tight closure between the casing of the chamber and the punch. For practical reasons the driving means for the press are situated outside the vacuum chamber.

On the rim of the container there is arranged a tipping trough 30 taking over the compacts removed from the cage and setting them into the container of the press. In order to bridge the gap between the cage 2 and the tipping trough 20 two juxtaposed and permanent sliding bars are fixed, between which the tappet 26 of the sliding carriage 21 may travel to push the compacts into the tipping trough 30.

After the hot-upsetting of the single compacts in the container 5 the bottom of the latter is opened and the hot-upset compact removed. These compacts are stored in the lower portion of the pressing room 4 until the last compact of the charge has been hot-upset. Then the vacuum may be abandoned and the compacts removed from the pressing room through an aperture not shown in the drawing.

The vacuum chamber is connected, whenever possible without reduction of the cross-sectional area, to the diffusion pump 31 of the pumpstand 9. As a pre-vacuum pump there serves e.g. the rotary oil pump 32.

In order not to have to pass the whole of the gases through the diffusion pump 31 when degasification starts, the pre-vacuum pump 32 may be connected directly to the vacuum chamber through the by-pass valve 33.

The accompanying drawing shows the vacuum-pumpstand 9 following the pressing room 4. It would however be possible to place the pumpstand at the other end of the entire apparatus, i.e. in front of the sintering chamber, instead of the cover 10, which latter would then have to close the pressing room. The feeding of the cage would in this case have to be done across the pressing room.

For the hot-upsetting of the degassed compacts, taking place in the pressing room of the described apparatus, the punch is pressed upon the compact set in the container in such a way that the specific pressure is 2 to 20 t./cm.$^2$, preferably 6 to 12 t./cm.$^2$. When the punch has borne upon the compact during a certain time, preferably 5 to 30 seconds with this pressure, the blank die 28 at the bottom of the container is removed and the compact pushed down by the punch into the lower portion of the pressing room which has such a capacity as to receive all the compacts of one charge of the cage after the hot-upsetting.

When such an apparatus has a size e.g. allowing compacts of 50 mm. diameter, a press of a power of 200 t. is sufficient to apply a specific presure of 10 t./cm.$^2$ over the cross-section of the container 5. The length of the cold-compact may be about 120 mm., that of the hot-upset compact about 80 mm. corresponding to a weight of about 400 grams. In a cage of an external diameter of 300 to 350 mm. and a length of 2300 mm. 120 compacts may be heated and sintered at once. According to experience a good degasification requires a vacuum-treatment of 12 to 20 hours at 600 to 630° C. An apparatus of the size as mentioned will therefore allow in 24 working hours an output of 120 sintered compacts with a low gas content, each of 50 mm. diameter, 80 mm. length and an average total weight of 50 kgs. Sintered aluminum compacts produced by this method are a useful starting material for the manufacture of small thin walled smooth or finned tubes to be manufactured by extrusion. Such tubes are used as canning tubes for nuclear fuel elements, e.g. in organically cooled reactors.

The utilization of small sintered compacts, manufactured according to this invention, as a primary material for extruding respectively impact extruding of small, thin-walled tubes has the further advantage over the traditional manufacture of such tubes from extruded billets that the loss incurred in the extrusion of these billets is greatly diminished.

Should it be desirable to work in a continuous way, a presintering furnace is attached to the loading side of the apparatus. This furnace consists of a tube which can be heated and evacuated and which is connected to the main apparatus by a sliding vacuum-tight valve. The tube is loaded with cold green billets, closed, evacuated and heated. After the billets have reached temperature, the sliding valve is opened and the billets are pushed into an empty line of the receiving device 2 of the main apparatus by means of a suitable transport arrangement. Once the tube is empty, the sliding valve is closed and the tube can be again recharged with green billets. An appropriate discharging valve or sluice is then arranged at the other end of the apparatus in order to allow discharging of the hot-upset compacts 7 without disturbing the vacuum in the apparatus.

It is to be understood that the present invention is not to be limited to the exact details of the apparatus as shown and described. Obvious modifications may occur and be realized without departing from the spirit of this invention and the scope of the appended claims.

The invention being thus described, what is claimed as new and desired to be secured by Letters Patent, is as follows:

1. Apparatus for the manufacture of dense sintered compacts from powdered material, comprising vacuum pump means, a gastight chamber operatively connected to said vacuum pump means, a sintering chamber which forms a part of the gastight chamber and comprises a heating device and a rotatable, drum-shaped receiving device comprising cold-compact-receiving means in the form of spaced receiving members extending parallel to the axis of the drum and providing a cage embodying a plurality of circles concentric with its axis, and in which said cold compacts are simultaneously heated and sintered in a vacuum, a pressing room which also forms a part of said gastight chamber and containing at least the tooling of a compacting press, by which tooling said sintered compacts are subsequently hot-upset one after the other; said gastight chamber being furthermore equipped with means for moving said compacts from said heated sintering portion of said gastight chamber to the container of said compacting press.

2. Apparatus according to claim 1, in which the front members of said cage are perforated in order to allow the charging and discharging of said compacts respectively into and out of said cage.

3. Apparatus according to claim 2, in which said front members of said cage have the shape of wheels with spokes, to which said supporting slats are fixed.

4. Apparatus according to claim 1, provided for the removing of said degassed and sintered compacts from said cage, with a sliding carriage travelling on a sliding bar running parallel to the axle of said cage, said sliding bar being fixed to the casing of said sintering chamber, preferably its bottom, and reaching out into the adjacent pressing room; said sliding carriage having a hinged tappet, said hinged tappet, when in upright position, stretching in between the single compacts of a file and thus when pulled out of said sintering chamber removing said compacts from said cage.

5. Apparatus according to claim 4, in which said front members of said cage are broken through from the circumferences of said front members up to said charging and discharging perforations, thus allowing said hinged tappet of said sliding carriage to pass in an upright position.

6. Apparatus according to claim 3, in which said spokes of said wheels are formed together with the corresponding broken rims of said wheel anchors to the flukes of which said outer supporting slats are fixed.

7. Apparatus according to claim 6, in which said supporting slats are sustained by further wheels with spokes or the like, arranged at suitable distances from one another between said front members of said cage.

8. Apparatus according to claim 7, in which said spokes of said wheels are connected to each other by a ring, arranged between said files of said compacts and the axle of said cage, said files being arranged in circles, to said ring being fixed in the inner supporting slats of said cage.

9. Apparatus according to claim 1, in which said pressing room contains a tipping trough, said tipping trough receiving said compacts removed from said sintering chamber and putting said compacts into said container of said press.

10. Apparatus according to claim 1, in which the punch of said press reaches into said pressing room of said gastight chamber through a gastight conduit, the driving members of said press being arranged outside said gastight chamber.

11. Apparatus according to claim 1, in which the bottom of said container of said press is a removable die.

12. Apparatus according to claim 1, in which the bottom of said container is a counterpunch.

13. Apparatus according to claim 1, in which there is inside said pressing room sufficient room in the surroundings of said container to receive the whole of said compacts of one charge of said receiving cage after their hot-upsetting in said press.

References Cited

UNITED STATES PATENTS

| | | | |
|---|---|---|---|
| 2,293,400 | 8/1942 | Morris et al. | 75—214 |
| 2,377,494 | 6/1945 | Greene | 18—14 X |
| 2,648,759 | 8/1953 | Machian et al. | 219—10.69 |
| 2,806,248 | 9/1957 | Craig | 18—4 |
| 3,051,812 | 8/1962 | Gschwender | 219—10.69 |
| 3,122,434 | 2/1964 | Reed et al. | 75—214 |
| 3,156,011 | 11/1964 | Olson | 18—16 |

J. SPENCER OVERHOLSER, *Primary Examiner.*

J. HOWARD FLINT, JR., *Examiner.*